United States Patent [19]

Inoue et al.

[11] 4,145,738
[45] Mar. 20, 1979

[54] PLURAL VIRTUAL ADDRESS SPACE PROCESSING SYSTEM

[75] Inventors: Koichi Inoue; Hajime Nonogaki, both of Kamakura; Tatsuo Urakawa, Yokohama; Kazuyuki Shimizu, Machida, all of Japan

[73] Assignee: Fujitsu Limited, Japan

[21] Appl. No.: 801,571

[22] Filed: May 31, 1977

[30] Foreign Application Priority Data

Jun. 8, 1976 [JP] Japan ............................... 51-66807

[51] Int. Cl.$^2$ .............................................. G06F 9/20
[52] U.S. Cl. ................................................... 364/200
[58] Field of Search ... 364/200 MS File, 900 MS File

[56] References Cited

U.S. PATENT DOCUMENTS

| 3,825,904 | 7/1974 | Burk et al. | 364/200 |
| 4,004,278 | 1/1977 | Nagashima | 364/200 |

Primary Examiner—Raulfe B. Zache
Attorney, Agent, or Firm—Staas & Halsey

[57] ABSTRACT

In a data processing system having a plurality of virtual address spaces, a virtual address is translated into a real address for accessing a main memory and the translation result is stored in a translation lookaside buffer, as in a processing system having a single virtual address space. Thereafter, in the case of the same virtual address as the above, the translation lookaside buffer is retrieved to translate the virtual address into a real address. Generally, even in the case of the same virtual addresses, if their virtual address spaces are different, the virtual addresses are translated into different real addresses. However, a control program, a control table or a common subroutine is provided in a common area in which the coordination of virtual and real addresses is always constant even in the case of different virtual address spaces. To enhance the efficiency of utilization of the translation lookaside buffer, common area indicating means is provided, by which the coordination of virtual and real addresses on the translation lookaside buffer is registered so that it can be used in common to a plurality of virtual address spaces.

8 Claims, 15 Drawing Figures

SGT = SEGMENT TABLES
PT = PAGE TABLES

HV=1 & LV=1 &
HBA≠0 & LBA≠16MB
& HBA>LBA

FIG. 5B

HV=1 & LV=1 &
HBA≠0 & LBA≠16MB
& HBA≦LBA

FIG. 5C

HV=1 & LV=0/1
& HBA=0

FIG. 5D

HV=1 & LV=1 &
HBA≠0 & LBA=16MB

FIG. 5E

HV=0 & LV=1 &
LBA=16MB

FIG. 5F

HV=1 & LV=0
& HBA≠0

FIG. 5G

HV=0 & LV=1
& LBA≠16MB

PLURAL VIRTUAL ADDRESS SPACE PROCESSING SYSTEM

BACKGROUND OF THE INVENTION

1. Field of the Invention

This invention relates to a plural virtual address space processing system, and more particularly to a plural virtual address space processing system for a data processing system of the type coordinating virtual and real addresses with each other corresponding to plural virtual address spaces and storing the result of coordination in a translation look aside buffer (hereinafter referred to as the table TLB), in which a common virtual register is provided for designating an area common to the virtual address spaces and when the result of coordination of the virtual and real addresses corresponding to the common area is stored in the abovesaid table TLB, it is registered in common to the virtual address spaces though they are different, thereby to provide for enhanced efficiency of use of the table TLB.

2. Description of the Prior Art

Recent data processing systems usually adopt the so-called virtual memory system. And the virtual memory system has a tendency that a single virtual memory system having only one address space is switched over to a plural virtual memory system having a plurality of address spaces. In the plural virtual memory system, only one job is permitted to exist in one virtual address space and virtual address spaces are prepared which are equal in number to the jobs of simultaneous operation. Since, only one job is assigned to each of the address spaces and since the address spaces do not interfere with one another, this system has the advantage that the operation of one job is not affected by the operation of other jobs. Further, this system has the merit that an increase in the number of address spaces is not subject to restriction by the architecture of hardware. In this case, areas common to the jobs, i.e. areas such as control programs, control tables for use therein and other common subroutines, are functions necessary for the jobs, so that they are provided for each virtual address space. Such areas will hereinafter be referred to as the common areas.

Also in such a plural virtual memory system as described above, processing for the coordination of the address of the virtual address space with a real address on a main memory is performed for each virtual address space as is the case with a single virtual address. And the result of such coordination is stored in a high-speed memory or table called a translation look aside buffer (TLB). In processing, the coordination of the virtual address with the real address is achieved by retrieving the table TLB. But in the common area prepared for each virtual address space as mentioned above, coordination of the virtual address with the real is always constant even in the case of different virtual address spaces. As a result of this, if the results of different coordinations are stored in the table TLB for respective different virtual address spaces, the efficiency of utilization of the table TLB is lowered.

SUMMARY OF THE INVENTION

An object of this invention is to provide a plural virtual address space processing system in which if the virtual address to be converted into a real address is in the common area, the result of coordination of the virtual address with the real address on a main memory is registered on the table TLB in such a manner that it can be used in common to different virtual address spaces, thereby to enable an efficient utilization of the table TLB.

Another object of this invention is to provide a plural virtual address space processing system which has common area indicating means and, when the virtual address to be converted into a real address is applied to the common area indicating means, the contents of the common area indicating means and the virtual address are immediately compared with each other and in the case of coincidence, a certain indication is provided with such indication being the same for different virtual address spaces.

Another object of this invention is to provide a plural virtual address space processing system in which when the common area is changed, the content of the common area indicating means is also immediately changed correspondingly.

Still another object of this invention is to provide a plural virtual address space processing system in which the result of coordination of virtual and real addresses corresponding to the common area in registered on the table TLB in common to different virtual address spaces so as not to remove other coordination results from the table TLB, thereby to enhance the efficiency of the entire system by the reduction of the capacity of a memory forming the table TLB.

According to the plural virtual address space processing system of this invention, in a data processing constructed so that virtual and real addresses are coordinated with each other corresponding to plural virtual address spaces, that a predetermined area in each of the plural virtual address spaces has an area common to them and the virtual address corresponding to the common area corresponds to a real address common to the plural virtual address spaces and adapted such that the result of coordination of the virtual and real addresses is stored on the table TLB and that processing is executed while retrieving the table TLB, there is provided common area designating memory means for designating the common area and when the result of coordination of the virtual and real addresses is registered on the table TLB, the content of the common area designating memory means is refered to and the coordination result corresponding to the common area is registered in common to the plural virtual addresses.

DESCRIPTION OF THE PREFERRED EMBODIMENTS

In a virtual storage system, during programming, a virtual space can be successively used to remove capacity limitations imposed on a main memory which can be used in practice. That is, the magnitude of the virtual space is dependent upon the architecture of hardware. For example, in the case where twenty-four bits can be employed for address designation, $2^{24} = 16,777,216$ bytes which are approximately equal to 16 mega bytes.

During programming, an address which is designated without regard to the magnitude of a real memory, (that is, a virtual address), is translated into a real address since it is necessary to access a buffer memory or a main memory in practice when the program is executed. This translation is dynamically achieved by a dynamic address translation mechanism of hardware at the time of execution of the program.

In the case of a plural virtual storage system, since respective programs are respectively assigned individual virtual address spaces, identical virtual addresses may exist in the respective virtual address spaces and a plurality of identical virtual addresses exist in the system as a whole.

Figure 1:
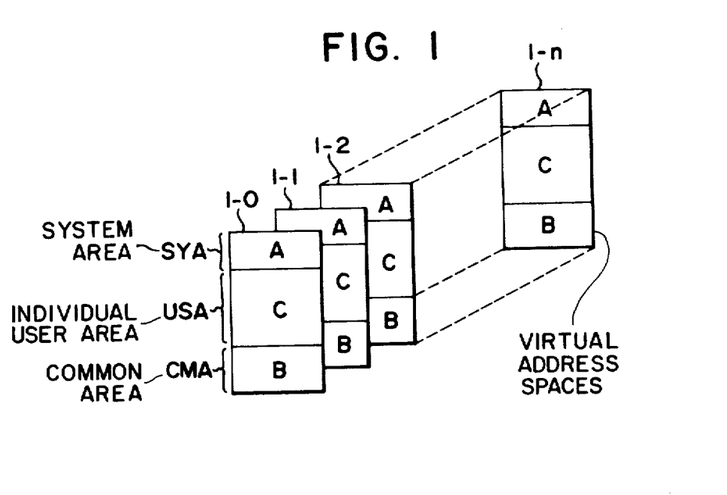
FIG. 1 is a diagram explanatory of the outline of plural virtual address spaces.
Figure 2:
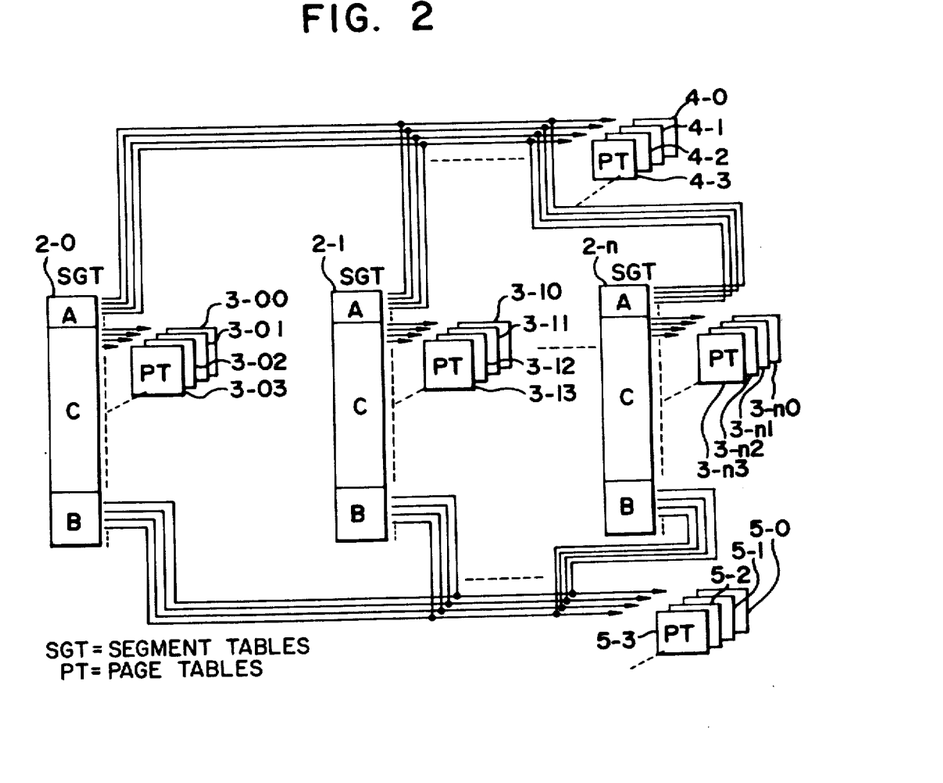
FIG. 2 is a diagram explanatory of the outlines of a segment table and a page table.

In FIGS. 1 and 2, reference numerals 1-0 to 1-n indicate virtual address spaces; 2-0 to 2-n designate segment tables; and 3-00, 3-01, ..., 3-10, 3-11, ..., 3-n0, 3-n1, ..., 4-0, 4-1, ..., 5-0, 5-1, ... identify page tables. As illustrated in FIG. 1, jobs are assigned the plurality of virtual address spaces 1-0 to 1-n respectively corresponding to jobs. The number of the virtual address spaces is limited mainly by an operating system. At present, it is possible to handle about 1500 address spaces. The virtual address spaces 1-0 to 1-n each have two common areas A and B and an area C called individual user area USA. The area A (a system area SYA) and the area B (a common area CMA) are prepared in common to the virtual address spaces 1-0 to 1-n.

In order that the addresses of the virtual address spaces may have one to one correspondence to the addresses of real address spaces on the main memory, the segment tables 2-0 to 2-n and the page tables 3-00, 3-01, ..., 3-10, 3-11, . . ., 3-n0, 3-n1, ..., 4-0, 4-1, ..., 5-0, 5-1, ... are prepared, as shown in FIG. 2. The segment tables 2-0 to 2-n respectively correspond to the individual virtual address spaces 1-0 to 1-n. And, to designate or identify one of the plurality of virtual address spaces, the leading address of the segment table is designated. For designating the leading address, use is made of, for instance, a register referred to as a segment base register (SBR).

The processing for obtaining a real address from a virtual address corresponding to a certain virtual address space may be considered to be performed as follows:- Based on the content of the segment base register SBR corresponding to one of the abovesaid virtual address spaces, for instance, 1-1, and one part of the bits of a given virtual address, one address on the segment table 2-1 shown in FIG. 2 is accessed. And based on the content of the accessed address of the segment table 2-1 and one part of the bits of the abovesaid virtual address, one address on one page table, for example, 3-11, is accessed. Then, based on the content of the accessed address of the page table 3-11 and one part of the bits of the abovesaid virtual address, the real address is determined. The result of coordination of the virtual address and the real address thus determined is stored in the table TLB. In the subsequent processing, the table TLB is retrieved at first to check the coordination of the virtual address and the real address and then the real address is determined. Of course, in the case where the coordination of the virtual and real addresses is not stored on the table TLB, the real address is determined by using the segment table 2 and the page tables 3, 4 and 5 again, and its result is stored on the table TLB. At this time, since the storage capacity of the table TLB is limited, one result of coordination which has not been used latest is removed from the table TLB to permit storing therein of the new coordination result.

Figure 3:
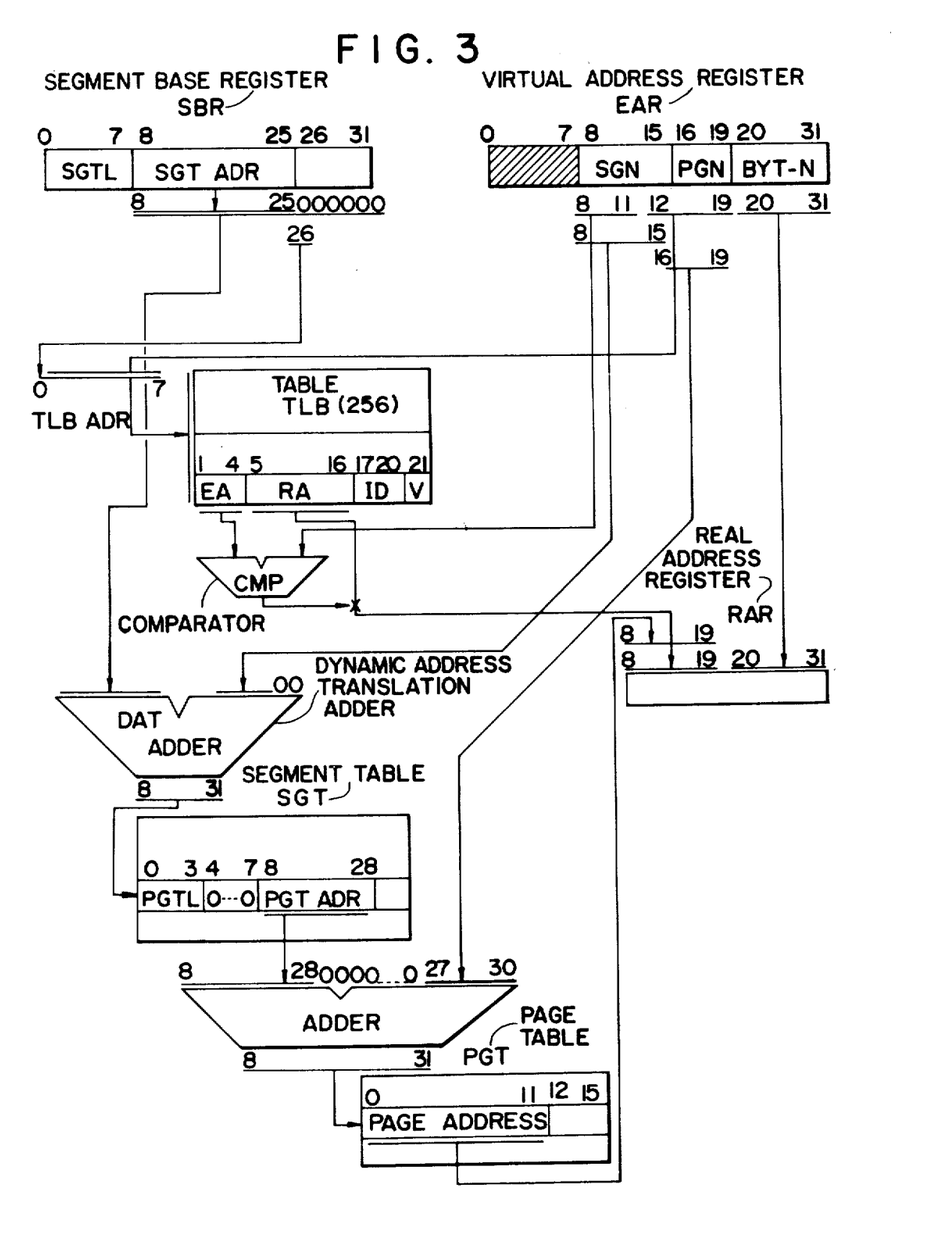
FIG. 3 is a block diagram explanatory of the procedure for translating a virtual address into a real address.

FIG. 3 is a diagram showing in detail the procedure of the above address translation.

As mentioned above, the virtual address space is divided into units of two stages, i.e. segment and page, and in accordance with the kind of the division, the virtual address is also divided into a segment number SGN, a page number PGN and an intra-page displacement BYT.N. The segment number SGN is indicative of which segment is occupied by the virtual address. Of twenty-four bits of the virtual address EA, eight bits, for example 64-K byte, 8 to 15, are used to indicate the segment number. The page number PGN is indicative of which page of the segment is occupied, and is represented by four bits of the virtual address EA, for instance 4-K byte page size, 16 to 19. The intra-page displacement BYT.N is indicative of which byte is occupied, and is represented by twelve bits of the virtual address EA, for example 64-K byte segment and 4-K byte page, 20 to 31.

For each segment and each page of the virtual address space, a segment table SGT and a page table PGT are formed by an operating system. Each entry of the segment table SGT has the leading address (of, for instance, twenty-one bits) of the page table PGT having reserved therein the real address of each page belonging to the segment, and other information.

Each entry of the page table PGT has information on the presence or absence of the page on the real memory and twelve higher-order bits of a real page address (of, for example, twenty-four bits).

At first, for designating the leading address of the segment table SGT, since eighteen higher-order bits of the leading address of the segment table are stored in the bits 8 to 25 of a segment base register SBR of FIG. 3, the leading address of the segment table can be obtained by adding 0s of six bits to the lower order of the segment base register.

On the other hand, based on the base register, the index register and the intra-page displacement designated in a program, an effective virtual address is obtained by hardware, and set in a virtual address register EAR. This virtual address (twenty-four bits) can be considered in terms of the segment number SGN (eight bits), the page number PGN (four bits) and the intra-page displacement BYT.N (twelve bits).

Then, the segment number SGN of the virtual address is compared with the segment table length indicated by the SGTL part of the abovesaid segment base register SBR. This comparison, not illustrated in the drawings, is achieved by subtracting the segment table length SGTL from the segment number SGN using the DAT ADDER. In this case, if the former is larger than the latter, the segment table entry desired to be obtained does not exist in the segment table SGT, so that the address translation is stopped.

The leading address of the segment table represented by the bits 8 to 31 of the segment base register SBR and the segment number represented by the bits 8 to 15 of the virtual address register EAR are added together in a dynamic address translation adder DAT ADDER, by which the desired segment table entry is detected from the segment table SGT. In this case, when an invalid bit in the entry (for example, a bit 31) is "1", the address translation is discontinued.

Since the bits, for example, 8 to 28, of the segment table entry thus detected are indicative of the leading address of the page table, these bits and the page number PGN represented by the bits 16 to 19 of the virtual address register EAR are added together in an adder ADDER and, based on the result of this addition, a desired page table entry is detected from the page table PGT. In this case, the page number PGN and the page table length PGTL indicated by the segment table entry are compared with each other. Where the former is larger than the latter, the page table entry desired to obtain does not exist in the page table PGT, so that the address translation is stopped. Further, if an invalid bit (for example, a bit 12) in the page table entry detected is "1", the content of the corresponding real page does not exist in the real memory, so that the address translation is also stopped.

Since the bits 0 to 11 in the page table entry are the twelve higher-order bits of the real page, they are transferred to the bits 8 to 19 of a real address register RAR and, at the same time, the intra-page displacement BYT.N represented by the bits 20 to 31 of the virtual address register EAR is transferred to the bits 20 to 31 of the real address register RAR and used as twelve lower-order bits of the real address.

Thus, the address translation is complicated.

As described above, in the data processing system, the processing is achieved for the coordination of the virtual and real addresses. As is seen from FIG. 2, even if the common areas A and B existing on the virtual address spaces 1-0 to 1-n are different from each other in the virtual address space 1 and accordingly the segment table 2, the real addresses are obtained by using the common page tables 4 and 5. That is, even where the virtual address spaces differ, if the virtual addresses of the areas A and B are the same, they correspond to the same real address. Therefore, when the results of coordination of the virtual and real addresses concerning the common areas A and B are stored in the table TLB, it is very wasteful if the coordination results are stored on the table TLB for all of the virtual address spaces. That is, if the results of coordination of the virtual and real addresses that the same address is extracted in spite of different virtual address spaces are individually registered on the table TLB, other coordination results which may be required in the subsequent processing are removed from the table TLB, thus remarkably lowering the efficiency of utilization of the table TLB.

Figure 4:
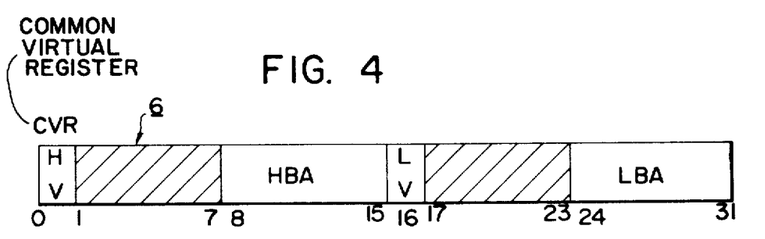
FIG. 4 is a diagram illustrating an example of a common virtual register CVR prepared in this invention.
Figures 5A, 5B:
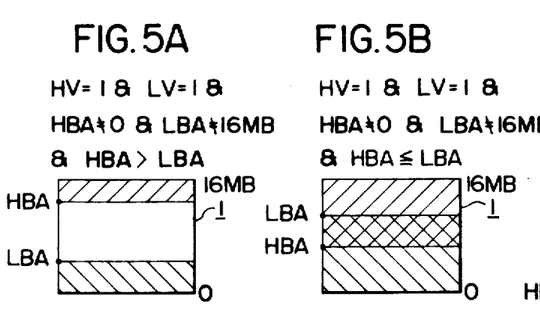
FIGS. 5A to 5H, inclusive, are diagrams explanatory of correspondence of the content designated by the common virtual register of FIG. 4 with the range of existence of a common area on a virtual address space.
Figure 5C:
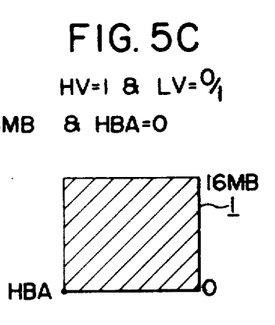
Figure 5D:
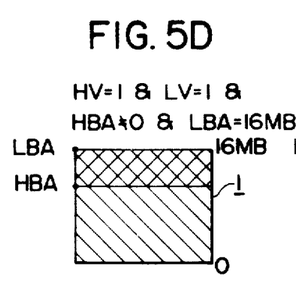
Figure 5E:
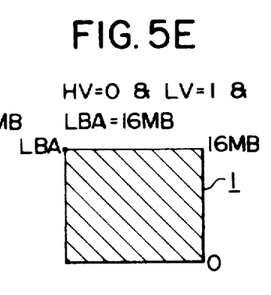
Figure 5F:
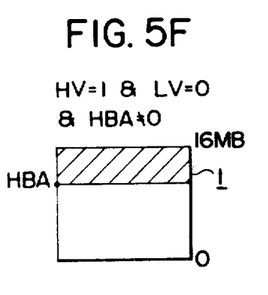
Figure 5G:
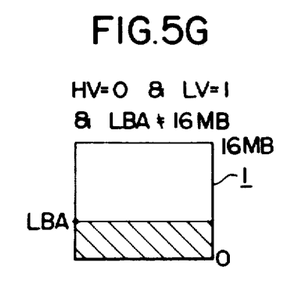
Figure 5H:
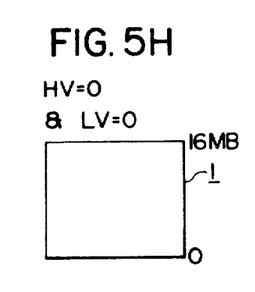

To avoid this, the present invention employs such a common virtual register CVR 6 as shown in FIG. 4, by which it is indicated the range on the virtual address space 1 in which the common areas A and B are positioned. In FIG. 4, reference character HBA designates a high bound address, which indicates an area corresponding to the area A shown in FIG. 1. As seen from FIGS. 5A to 5H, the abovesaid address indicates that the area from the address designated by the content of the above field HBA to a maximum virtual address (for example, 16 MB) of the virtual address space is the common area. Reference character HV identifies a high bound address validity indicating bit, and when the high bound address validity indicating bit has the logic "1", it indicates that the address designated by the field HBA is valid. Reference character LBA denotes a low bound address, which indicates an area corresponding to the area B shown in FIG. 1. And, as is seen from FIG. 4, it is indicated that the area from the address "0" of the virtual address space to the address indicated by the content of the abovesaid field LBA is the common area. Reference character LV represents a low bound address validity indicating bit and when this bit has the logic "1", it indicates that the address indicated by the field LBA is valid.

The ranges which the common areas A and B occupy on the virtual address space which differ with systems, as shown in FIGS. 5A to 5H. To set the abovesaid information HV, HBA, LV and LBA in the common virtual register 6 corresponding to the modes depicted in FIGS. 5A to 5H, for instance, a load common virtual register instruction (hereinafter referred to as the LCVR instruction), which is prepared in this invention, is executed.

Figure 6:
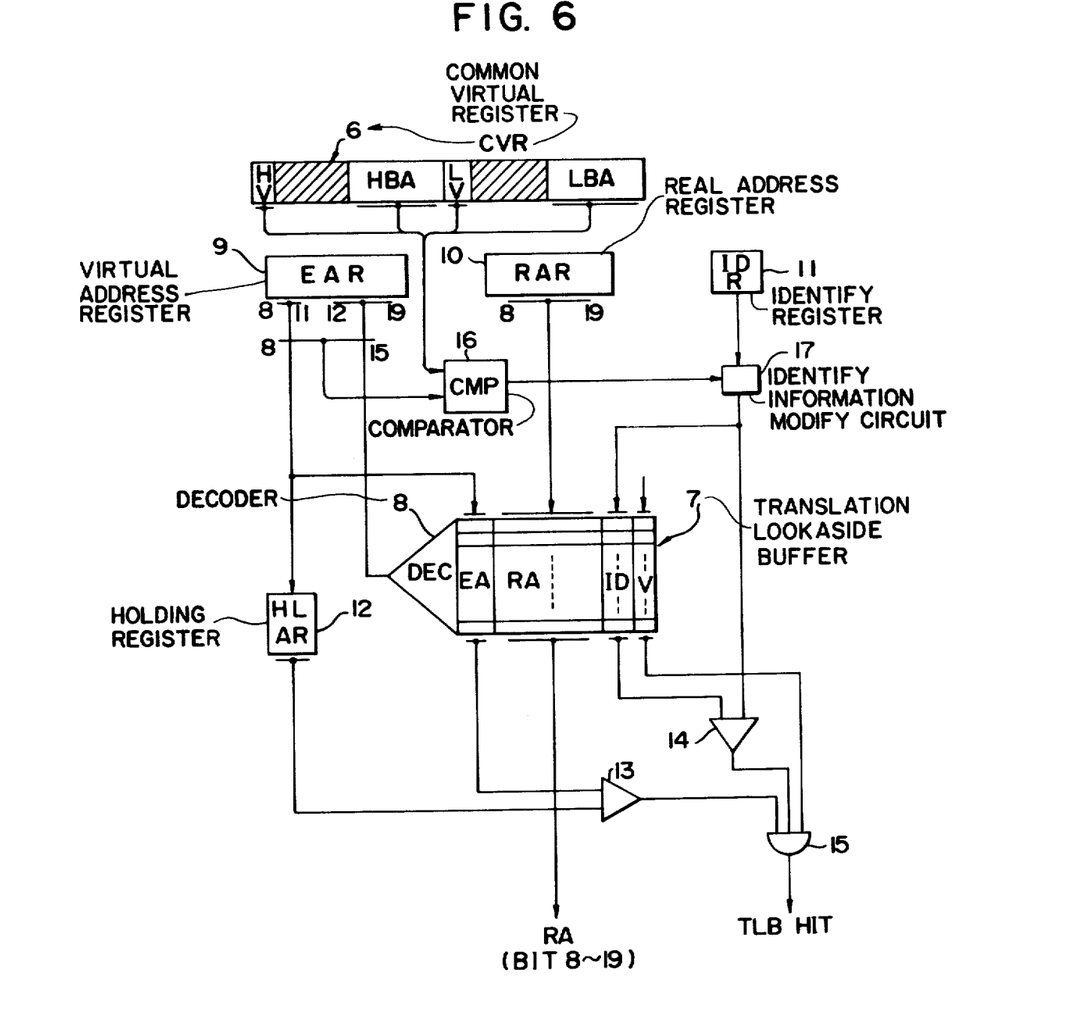
FIG. 6 is a block diagram of a processing system illustrating an embodiment of this invention.

FIG. 6 illustrates the construction of an embodiment of this invention adapted such that based on the content set in the common virtual register, the results of coordination of virtual and real addresses corresponding to the common areas A and B are stored in common to the virtual address spaces. In FIG. 6, reference numeral 6 indicates a common virtual register CVR; 7 designates a translation lookaside buffer TLB; 8 identifies a decoder for accessing a predetermined address of the table TLB; 9 denotes a virtual address register, in which is set the virtual address EA to be translated into a real address RA, for example, when a central processing unit executes processing; 10 represents a real address register, in which is set the real address RA to be registered when the result of coordination of virtual and real addresses is written in the table TLB 7; 11 shows a virtual address space identify information register, in which is set identify information ID indicative of the virtual address space to which the coordination result corresponds when the coordination result is registered on the table TLB 7 or read out therefrom; 12 refers to a logical address holding register, in which is temporarily held one portion of the content of the register 9 when the table TLB is read out; 13 indicates a first coincidence detector circuit, which checks coincidence of one portion of bits of the virtual address EA read out from the table TLB with the content of the holding register 12; 14 indicates a second coincidence detector circuit, which checks coincidence of the indentify information ID read out from the table TLB 7 with the identify information set in the register 11 when the former information is read out from the table TLB 7; V designates a validity indicating bit, which indicates that the result of coordination of the virtual and real addresses registered on the table TLB 7 is valid when the validity indicating bit has the logic "1"; 15 identifies an AND circuit, whose output of the logic "1" indicates that the real address RA corresponding to the virtual address EA set on the virtual address register 9 exists on the table TLB 7 (TLB HIT); 16 denotes a comparator circuit provided according to this invention, which circuit checks whether or not the virtual address EA set in the virtual address register 9 corresponds to the addresses in the common areas A and B set in the common virtual register CVR 6; and 17 represents an identify information modify circuit, which modifies the identify information set in the register 11, that is, the information designating the virtual address space, into a predetermined pattern when the comparator circuit 16 has the logic "1".

To access a memory when the central processing unit executes processing, it is necessary to translate the virtual address EA into the real address RA. To this end, the first step is to access the table TLB 7. That is, the virtual address EA to be translated is set in the virtual address register 9 and, for example, bits 8 to 11 of the virtual address EA are held in the holding register 12 and, with bits 12 to 19, the table TLB 7 is accessed to be read out. By this operation, the identify information ID indicating the virtual address space to which the information previously registered, that is, the result of coordination of the virtual and real addresses, and the present coordination result correspond, and the validity indicating bit V are read out from the corresponding address of the table TLB 7. The coordination result is representative of the coordination of 8th to 11th bits of the virtual address with 8th to 19th bits of the real address. Accordingly, when the 8th to 11th bits of the virtual address thus read out and the content of the holding register 12 are coincident with each other, it is indicated that the 8th to 19th bits of the real address read out correspond to the virtual address to be translated. Consequently, the coincidence detector circuit 13 checks the above coincidence, and produces an output of the logic "1" when detects the coincidence. Further, in the above said translation, the central processing unit sets identify information in the register 11 for indicating the virtual address space to which the virtual address set in the virtual address register 9 corresponds. And the coincidence detector circuit 14 checks whether the identify information ID read out from the table TLB 7 and the content of the register 11 are coincident with each other or not, and if coincident, produces an output of the logic "1". Further, the validity bit V is read out from the table TLB 7, and applied to the AND circuit 15. Accordingly, the state in which the AND circuit 15 produces the output of the logic "1" implies the following facts: (1) The coordination of the virtual address corresponding to that EA set in the register 9 with the real address exists on the table TLB 7; (2) The coordination is valid; and (3) the coordination corresponds to the desired virtual address space. As a result of this, a signal TLB HIT is generated and, the real address RA read out at this moment is employed as a translated real address for accessing the memory.

At this time, if the AND circuit 15 does not turn on, it implies that the coordination of the desired virtual address with the real address does not exist on the table TLB 7. In this case, the real address is extracted by the segment table SGT and the page table PT and the coordination result is registered on the table TLB 7. That is, the extracted real address is set in the register 10, and registered on the table TLB 7 by using the virtual address EA set in the register 9. Needless to say, in this case, the identify information ID indicating the virtual address space is set in the register 11, and registered on the table TLB 7. Further, the validity indicating bit V is written in the form of the logic "1" in table TLB 7.

In this case, however, if the virtual address EA set in the register 9 lies in the address given by the content of the common virtual register 6, the comparator circuit 16 produces the logic "1", by which the identify information ID set in the register 11 is modified by the modify circuit 17 into a predetermined pattern and is registered on the table TLB 7. Of course, in the case where the virtual address EA set in the register 9 does not lie in the abovesaid common area, the identify information ID set in the register 11 is registered as it is on the table TLB 7.

In this state, in the processing by the central processing unit, the virtual address EA is set in the register 9 for extracting the real address and the table TLB 7 is accessed to be read out. At this time, if the virtual address EA set in the register 9 lies in the address given by the content of the common virtual register 6, the comparator circuit 16 produces an output of the logic "1" as is the case with the above. Accordingly, in this case, too, the identify information ID set in the register 11 is modified by the modify circuit 17 into a predetermined pattern and supplied to the coincidence detector circuit 14. In the abovesaid accessing for readout, the table TLB 7 is accessed with the virtual address EA set in the register 9, by which the identify information ID is read out from the corresponding address on the table TLB 7. Needless to say, the identify information ID thus read out is a predetermined pattern written in the previous registration. Therefor, the coincidence detector circuit 14 provides a coincidence output even if the virtual address spaces are different. That is, the AND circuit 15 produces the signal TLB HIT and it is regarded the desired coordination of virtual and real addresses exists on the table TLB 7, and the real address RA thus read out is utilized. This means the following fact:— Even when the virtual address spaces are different, if the virtual address EA to be translated corresponds to the common area A or B shown in FIG. 1, the coordination result is registered in common to both of the virtual address spaces, and not as a separate coordination in table TLB 7 for each of them.

Figure 7A:
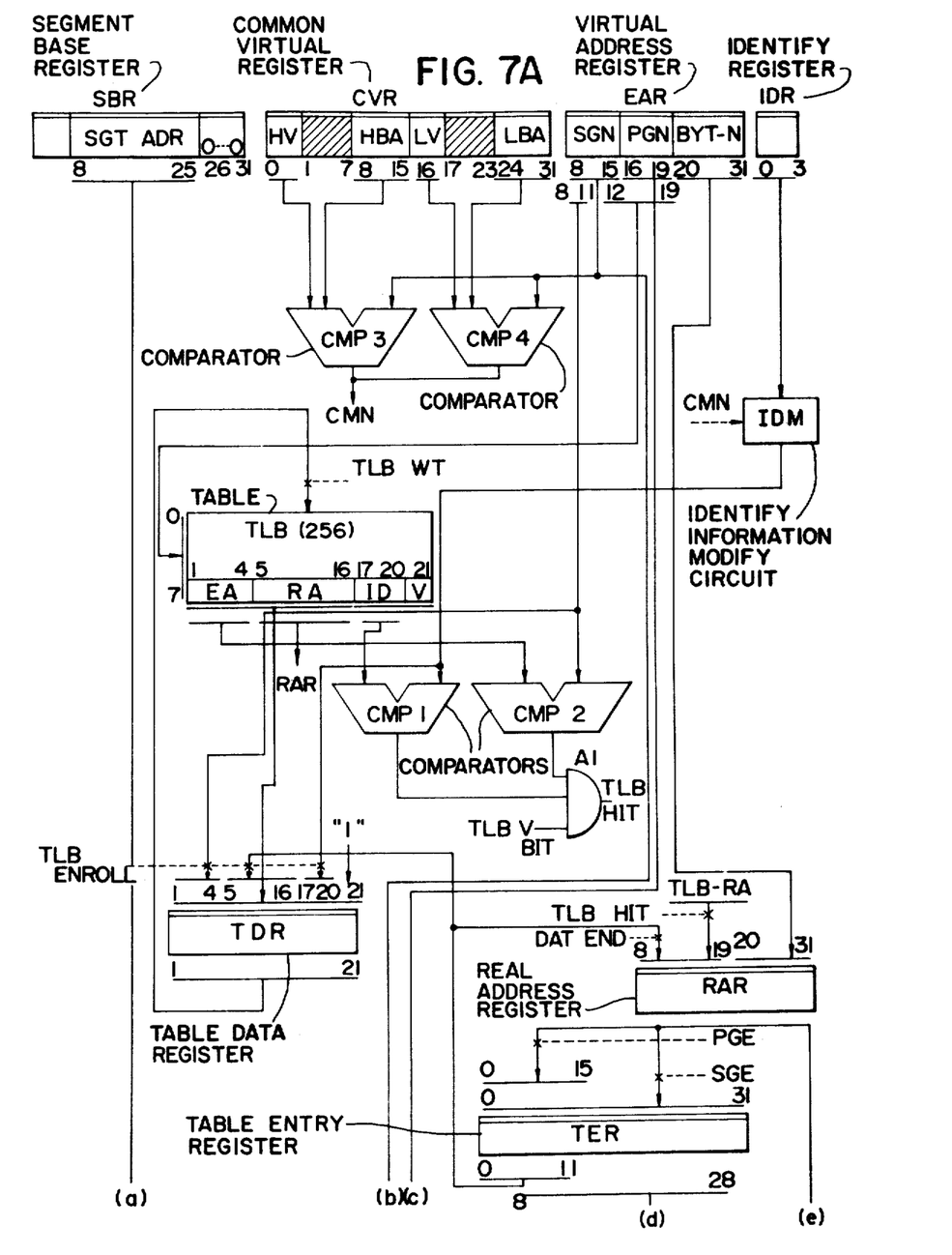
FIGS. 7A and 7B are block diagrams of the address translation procedure showing more in detail the processing system of FIG. 6, the diagrams being interconnected at the positions of the same reference characters (a), (b), (c), (d) and (e).
Figure 7B:
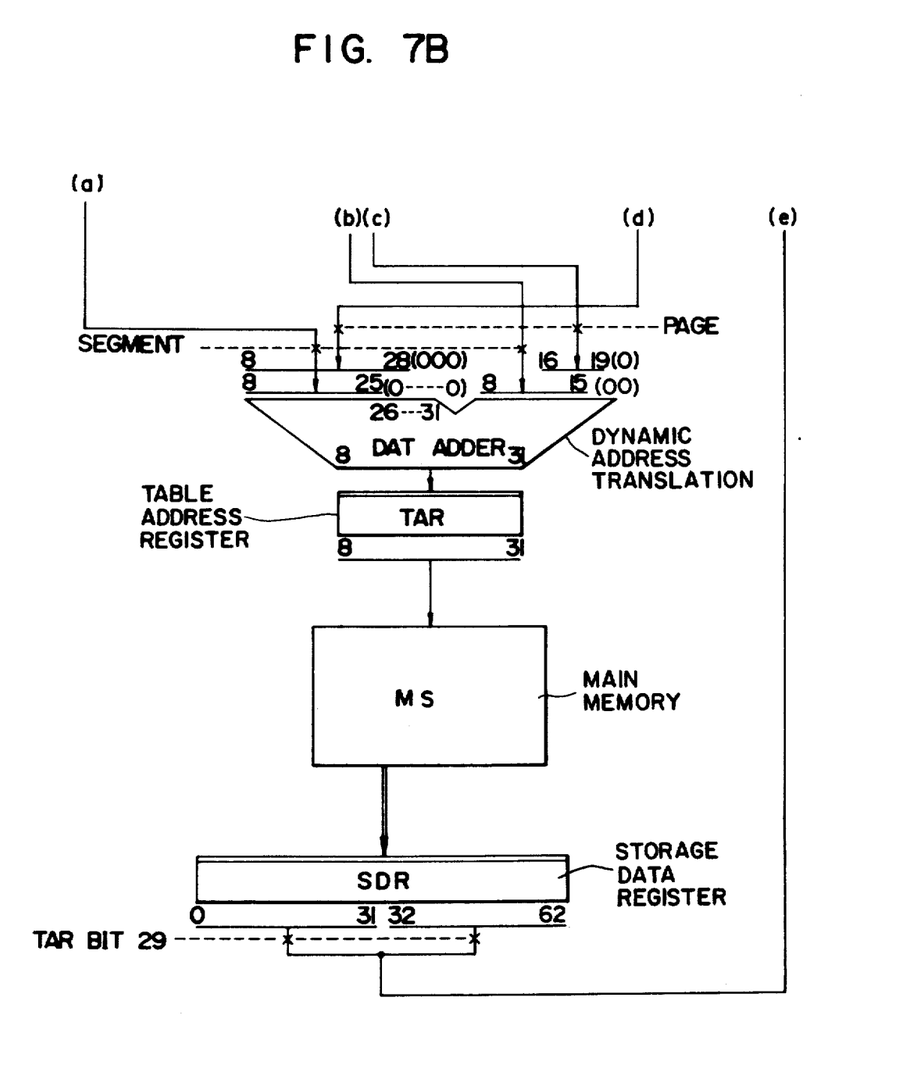

Turning now to FIGS. 7A and 7B, the operation of the system of this invention will hereinafter be described in detail. FIGS. 7A and 7B show the table TLB, the address translation mechanism and the common virtual register.

The identify information ID of the virtual address space written in each element of the table TLB is administered in terms of hardware, and a segment table origin stack (hereinafter referred to as the STO stack) holds segment table origin addresses of plural spaces in the TLB at the same time.

The STO stack is a high-speed memory which stores the coordination of the segment table leading address of each address space indicated by a segment base register SBR with the identify information ID of hardware.

Upon switching of the virtual address space by the operating system, the STO stack is referred to at first. If information of the same value as the segment table leading address exists in the STO stack, then the virtual address space is already registered in the STO stack, so that the identify information ID of the STO stack is valid. But in the absence of the abovesaid information, the virtual address space is newly registered, by which the identify information ID for the virtual address space is obtained. And this identify information ID is stored in an identify register IDR. Thus, it is possible to remarkably reduce the probability that the content of the table TLB becomes invalid at each switching of the virtual address space.

In FIGS. 7A and 7B, when to translate a virtual address into a real address, reference is made to the table TLB prior to the translation by the use of the segment table SGT and the page table PGT.

Then, when the table TLB has been accessed with the address (the page number PGN) of the bits 12 to 19 of the virtual address register EAR, this address is decoded and any one of, for instance, 256 entries, is selected. In such a case, an output TLB HIT is obtained from an AND gate A1 by satisfying the conditions that the validity indicating bit V representative of validity of the selected entry, that a 4-bit pattern from the identify register IDR and the identify information ID in the entry are compared with each other in a comparator CMP1 to obtain a coincidence output and that the bits 8 to 11 of the virtual address register EAR and the virtual address EA in the entry are compared with each other in a comparator CMP2 to obtain a coincidence output. An entry in the table TLB selected at the same time is set in a TLB data register TDR and, by the output TLB HIT, a gate is opened, by which the real address RA in the entry is set in bits 8 to 19 of a real address register RAR and, at the same time, bits 20 to 31 of the virtual address register EAR are set as low-order bits of the real address register RAR.

On the other hand, before the table TLB is accessed with the virtual address, the high bound address HBA represented with bits 8 to 15 of the common virtual register CVR and the address (the segment number SGN) represented with bits 8 to 15 of the virtual address register EAR are compared with each other in a comparator CMP3 and, further, the low bound address LBA represented with bits 24 to 31 of the common virtual register CVR and the address (the segment number SGN) represented with bits 8 to 15 of the virtual address register EAR are compared with each other in a comparator CMP4. When the both validity indicating bits HV and LV are "1" and the common area is indicated, a common indicating signal CMN is produced, by which an identify information modify circuit IDM is changed over to modify the 4-bit pattern into all "0". That is, of sixteen patterns obtainable with four bits, "0" is used in the case of the common area and the remaining "1" to "15" are used for entries of other virtual address spaces.

Further, in the case of reading the identify information ID of the common area in the entry of the table TLB, the abovesaid all "0" is read therein, so that when the both are compared with each other in the comparator CMP1, a coincidence output is produced to obtain the real address of the common area.

Next, where the TLB entry is not the entry for this virtual address, the output TLB HIT is not produced, so that the real page address is obtained by immediately referring to the segment table SGT with the segment number SGN and the page number PGN represented by the high-order bits of the virtual address EA.

That is, the segment table leading address indicated by the segment base register SBR and the segment number SGN of the virtual address register EAR are added together in a dynamic address translation adder DAT ADDER and the result of addition is set in a table address register TAR. Then, the segment table SGT stored in a main memory MS is accessed with the abovesaid result used as an address.

The width of data read out from the main memory MS is 8-byte, and this is set in a storage data register SDR. Since bits 0 to 31 (even) and bits 32 to 63 (odd) of the data from 4-byte segment table entries, "odd" or "even" is selected depending upon whether the bit 29 is "1" or "0", and a segment entry gate SGE is opened to transfer the 4-byte data to a table entry register TER.

Next, bits 8 to 28 of the table entry register TER and the page number PGN represented with bits 16 to 19 of the virtual address register EAR are added together in the adder DAT ADDER and the result of the addition is set in the table address register TAR. And this result is used as an address for accessing the page table PGT in the main memory MS to read out therefrom a table entry, which is set in the storage data register SDR. In this case, the data width of the page table is 2-byte and either one of groups of bits 0 to 15 and bits 16 to 31, or either one of groups of bits 32 to 47 and bits 47 to 62 of the data bits set in the register SDR is selected depending upon whether the bit positions 29 to 30 are "00", "01", "10", or "11". Then, the entry gate PGE is opened to transfer the 2-byte data to bits 0 to 15 of the table entry register TER.

The bits 0 to 11 of the table entry register TER are transferred to bits 8 to 19 of the real address register RAR and, at the same time, the low-order bits 20 to 31 of the virtual address register EAR are transferred as they are to the low-order bits 20 to 31 of the real address register RAR. When the low-order bits of the virtual address register EAR are set in some other register, they are transferred therefrom.

The data of the real address register RAR is used as a translated real address for accessing the memory.

At the same time, the coordination of the virtual and real page addresses is registered in the entry of the table TLB, along with the identify information ID.

In this case, the TLB data register TDR performs the function of reading out the entry from the table TLB to set the entire bit byte width as described above and, at the same time, also serve to assemble data for registration in the table TLB after the dynamic address translation. That is, the virtual address EA, the real address RA, the identify information ID and the validity indicating bit V respectively set the four bits (8 to 11) of the virtual address register EAR, the twelve bits (0 to 11) of the table entry register TER, the four bits (0 to 3) of the identify register IDR and "1" from the generator in the TLB data register TDR by means of the opening of a TLB registration gate labeled TLB Enroll.

When the entry to be registered in the table TLB has been assembled in the TLB data register TDR, a TLB write gate TLB WT is opened by using the cycle of registration, through which gate the abovesaid entry is written in one of 256 entries of the table TLB. If 256 entries are all occupied, the previously entry is removed by newly writing the abovesaid entry. In the case of using two tables TLB of primary and alternate blocks, the entry is written in selected one of them.

For indicating that a certain coordination result in the table TLB corresponds to the common area, it is also possible to employ such a method which is exactly the same as ordinary methods in connection with the virtual address space identification but adds a specific bit for each coordination in the table TLB. With this method, another bit is added to the table TLB and when new address coordination is stored therein, if is corresponds to the common area, the abovesaid bit is made "1". And where the abovesaid bit is "1" as a result of retrieval of the table TLB, the output from the coincidence detector circuit in FIG. 6 is made "1" regardless of the result of its coincidence detecting operation.

As has been described in the foregoing, according to this invention, when the result of address coordination corresponds to the common area A or B, it is registered on the table TLB in common to different virtual spaces, thereby to efficiently utilize the table TLB and hence enhance the efficiency of the system.

It will be apparent that many modifications and variations may be effected without departing from the scope of novel concepts of this invention.

What is claimed is:

1. A plural virtual address space for processing system for a data processing system for performing data processing and which comprises a translation mechanism means for translating a virtual address into a real address and a memory means, operatively connected to said translation mechanism means, for storing the real address translated by the translation mechanism means and in which when data processing is performed, if a desired real address is stored in the memory means, the real address is used for data processing and if not stored in the memory means, the desired real address is obtained with the translation mechanism means, said plural virtual address space processing system comprising:

common area indicating means, operatively connected to said translation mechanism means, for indicating the range of a common area in which the same virtual address is translated into the same real address in each virtual address space; and a comparator circuit, operatively connected to said translation mechanism means and said common area indicating means, for detecting whether or not the virtual address to be translated into the real address lies in the range indicated by the common area indicating means;

wherein when the real address is stored in the memory means, if the virtual address corresponding to the real address is indicated by said common area indicating means as an address of the common area, then common area identify information is stored together with the real address, and wherein if the virtual address corresponding to the real address is indicated by said common area indicating means as an address of another area than the common area, then virtual address space identify information is stored together with the real address.

2. A plural virtual address space processing system according to claim 1, wherein the common area indicating means is constructed so that the content of its indication of the range of said common area can be rewritten by means of programs inputted into said data processing system.

3. A plural virtual address space processing system according to claim 1, wherein the common area identify information is a specific bit which is added to a bit pattern used for the virtual address space identify information.

4. A plural virtual address space processing system according to claim 1, wherein the comparator circuit for detecting whether or not the virtual address lies in the common area comprises means for respectively comparing a high bound address and a low bound address, stored in the common area indicating means, with the associated part of the virtual address.

5. A plural virtual address space processing system according to claim 2, wherein when the virtual address is detected by the comparator circuit to lie in the common area, switching means of a virtual address space identify information modify circuit, operatively connected to said comparator circuit and said memory means, is actuated to modify the bit pattern used as the virtual address space identify information.

6. A plural virtual address space processing system according to claim 3, wherein when the virtual address is detected by the comparator circuit to lie in the common area, switching means of a virtual address space identify information modify circuit, operatively connected to said comparator circuit and said memory means, is actuated to modify the bit pattern used as the virtual address space identify information.

7. A plural virtual address space processing system according to claim 4, wherein when the virtual address is directed by the comparator circuit to lie in the common area, switching means of a virtual address space identify information modify circuit, operatively connected to said comparator circuit and said memory means, is actuated to modify the bit pattern used as the virtual address space identify information.

8. A plural virtual address space processing system for a data processing system comprising an address translation means for translating a virtual address into a corresponding real address and a translation lookaside buffer memory means, operatively connected to said address translation means, for storing said address translation correspondence; further comprising an additional means, operatively connected to said address translation means and said translation lookaside buffer memory means for controlling same such that when said virtual address to be translated lies within a preselected common area, said address translation correspondence is stored in such translation lookaside buffer memory means wherein more than one virtual address may be translated in common to a single real address.

* * * * *

UNITED STATES PATENT AND TRADEMARK OFFICE
CERTIFICATE OF CORRECTION

PATENT NO. : 4,145,738
DATED : March 20, 1979
INVENTOR(S) : Koichi Inoue et al

It is certified that error appears in the above-identified patent and that said Letters Patent are hereby corrected as shown below:

On the title page, after "Attorney, Agent, or Firm", "Stass & Halsey" should be --Staas & Halsey--.
Column 4, line 20, "BYT.N" should be --BYT·N--.
Column 4, line 28, "BYT.N" should be --BYT·N--.
Column 4, line 53, "BYT.N" should be --BYT·N--.
Column 5, line 31, "BYT.N" should be --BYT·N--.

Signed and Sealed this

Twenty-fifth Day of September 1979

[SEAL]

Attest:

*Attesting Officer*

LUTRELLE F. PARKER
*Acting Commissioner of Patents and Trademarks*